United States Patent [19]
Miller et al.

[11] Patent Number: 6,112,258
[45] Date of Patent: Aug. 29, 2000

[54] MULTI-CYCLE I/O ASIC COMMUNICATION SYSTEM HAVING AN ARBITER CIRCUIT CAPABLE OF UPDATING ADDRESS TABLE ASSOCIATED WITH EACH I/O ASIC ON BUS

[75] Inventors: David S. Miller, Framingham, Mass.; Kenneth J. DeLong, Hollis, N.H.

[73] Assignee: 3Com Corporation, Santa Clara, Calif.

[21] Appl. No.: 09/044,291

[22] Filed: Mar. 19, 1998

[51] Int. Cl.[7] .................................................. G06F 13/00
[52] U.S. Cl. ............................ 710/19; 710/19; 710/104; 710/105
[58] Field of Search ................................ 710/9, 27, 107, 710/268, 240, 8, 19, 104, 105, 11; 395/275, 375; 709/242; 711/141, 168, 221

[56] References Cited

U.S. PATENT DOCUMENTS

| | | | |
|---|---|---|---|
| 5,175,820 | 12/1992 | Gephardt | 395/275 |
| 5,278,829 | 1/1994 | Dunlap | 370/94 |
| 5,392,422 | 2/1995 | Hoel et al. | 395/550 |
| 5,491,796 | 2/1996 | Wanderer et al. | 395/200.09 |
| 5,619,722 | 4/1997 | Lovrenich | 395/822 |
| 5,668,952 | 9/1997 | Slane | 395/200.75 |
| 5,732,280 | 3/1998 | Bealkowski et al. | 395/828 |
| 5,829,033 | 10/1998 | Hagersten et al. | 711/141 |
| 5,838,931 | 11/1998 | Regenold et al. | 395/308 |
| 5,862,375 | 1/1999 | Gephardt | 395/651 |
| 5,890,217 | 3/1999 | Kabemoto et al. | 711/141 |
| 5,898,886 | 4/1999 | Hewitt | 395/890 |
| 5,940,596 | 8/1999 | Rajan et al. | 395/200.72 |
| 5,987,571 | 11/1999 | Shibata et al. | 711/141 |

OTHER PUBLICATIONS

*Motorola MPC860 PowerQuicc User's Manual*, 1996.

*Primary Examiner*—Thomas C. Lee
*Assistant Examiner*—Chun Cao
*Attorney, Agent, or Firm*—Weingarten, Schurgin, Gagnebin & Hayes LLP

[57] ABSTRACT

An arbiter circuit is employed to isolate a processor from a plurality of Input/Output Application Specific Integrated Circuits ("I/O ASICs"). The processor is coupled to the arbiter through a control bus, an address bus and a data bus. The arbiter is coupled to the I/O ASICs through an extension of the control bus and a combined address/data bus. The arbiter manages control of the control bus extension and address/data bus to enable contemporaneous transmission ("broadcast") of messages to the I/O ASICs, and enable the processor to access the I/O ASICs. Only one of the I/O ASICs is granted control of the control bus extension and address/data bus at any point in time. The processor may also be granted sole control of the control bus extension and address/data bus.

9 Claims, 5 Drawing Sheets

MULTI-CYCLE I/O ASIC COMMUNICATION SYSTEM HAVING AN ARBITER CIRCUIT CAPABLE OF UPDATING ADDRESS TABLE ASSOCIATED WITH EACH I/O ASIC ON BUS

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The present invention relates generally to network switching devices, and more particularly to the broadcast of commands within a network switch.

Network switches commonly employ an address table to facilitate the flow of data units in a network. The address table includes entries that indicate address information for various devices connected with the network such as computers and printers. In particular, the address information is employed to identify which port or ports in the switch should be used for forwarding the data unit to a particular device or group of devices in the network. Each data unit includes a header portion with a source address field and a destination address field. Following receipt of the data unit the switch attempts to locate an entry in the address table that pertains to the destination address specified in the data unit header. If a pertinent entry is located in the address table then the information contained in that entry is employed to specify the port or ports to be used for the "forwarding" of the data unit. If a pertinent entry cannot be located in the address table then the switch may "flood" the data unit by transmitting the data unit through every relevant port except the port on which the data unit was received. Hence, network and switch bandwidth is conserved if a pertinent entry is available in the address table.

The address table can be updated by "learning" new address information. Address information can be learned by employing the source address specified in the data unit header. If a first data unit is transmitted from a first device to a second device via the switch, and the switch does not have the address for the first device in its address table, then upon the initial transmission from the first device to the second device the switch learns address information for the first device from the source address field of the first data unit. If address information for the second device is also unknown, the switch floods the first data unit in order to accomplish transmission to the second device. If the second device responds by transmitting a second data unit back to the first device via the switch then the switch learns the address of the second device from the source address field of the second data unit. The switch employs the learned address information for the first device to "forward" the second data unit toward the first device via a single port. In a subsequent transmission from the first device to the second device the switch employs the learned address information for the second device to efficiently "forward" the data unit toward the second device via a single port without flooding the data unit through the network.

In an effort to ensure that the address table contains accurate address information for active data flows, unutilized entries in the address table may be deleted in accordance with an "aging" technique. In particular, any entries that are not referenced in response to a source address search within a predetermined aging interval are deleted.

Input and output ("I/O") functions in a network switch are often implemented on Application Specific Integrated Circuits ("ASICs"). Because of limitations in the maximum practical die size, a plurality of I/O ASICs may be employed in a single network switch device. Each I/O ASIC must have access to the address table in order to enable learning, forwarding and aging operations. One technique to provide each I/O ASIC with access to the address table is to employ a single, centralized address table. However, the use of a centralized address table complicates the task of increasing the number of ports in the switch because the memory bandwidth required to support address searching increases as the number of ports increases.

One known solution to the above described problem involves the use of a distributed address table. The distributed address table comprises a plurality of separate table segments, each of which is associated with one particular I/O ASIC. The use of a distributed address table simplifies the task of increasing the number of ports in the switch because the bandwidth required for address searching is limited by the number of ports supported by each ASIC rather than the number of ports in the entire switch. However, implementing each and every learning, forwarding and aging operation is more complex when a distributed address table is employed because different events occur simultaneously at different table segments. Consequently, situations will result where the segments will not each contain identical sets of entries. Such a loss of inter-segment consistency has a deleterious effect on switch operation. Coherence algorithms can be applied to eliminate inconsistency among tables and preserve correct switch operation. However, efficient means for sharing commands related to learning and aging operations is required to realize the full benefit of coherence algorithms.

BRIEF SUMMARY OF THE INVENTION

In accordance with the present invention, an arbiter/transceiver circuit is employed to isolate a processor from a plurality of Input/Output Application Specific Integrated Circuits ("I/O ASICs"). The processor 35 is coupled to the arbiter/transceiver through a control bus, an address bus and a data bus. The arbiter/transceiver is coupled to the I/O ASICs through an extension of the control bus and a combined address/data bus. The arbiter/transceiver manages control of the control bus extension and address/data bus to enable the broadcast of messages between the I/O ASICs and to enable accesses from the processor to the I/O ASICs. In particular, only one of the I/O ASICs is granted control of the control bus extension and address/data bus at any point in time. The processor may also be granted sole control of the control bus extension and address/data bus.

Control of the control bus extension and address/data bus may be requested and granted via individual request and grant lines. Separate request and grant lines individually couple the arbiter to each I/O ASIC. In order to be granted control of the address/data bus, an I/O ASIC must first generate a request by asserting the request line. In response to the request from the I/O ASIC, the arbiter/transceiver arbitrates between the requesting I/O ASIC and any other requests for control of the address/data bus that are pending in accordance with predetermined criteria. For example, opportunities for control of the address/data bus can be granted based on a weighted round-robin basis where each I/O ASIC has one opportunity for control of the address/data bus in a predetermined time period and the processor has a number of opportunities for control of the address/data bus that is equal to the sum of the opportunities of the I/O ASICs. The opportunities may be interleaved to achieve a relatively even distribution. The arbiter/transceiver grants control of the address/data bus to an I/O ASIC by asserting the grant line that couples the arbiter/transceiver with the I/O ASIC. In response to the grant line, the I/O ASIC employs the bus for as long as necessary. The arbiter/transceiver refrains from granting control of the address/data bus to another I/O ASIC while the bus is being utilized.

Additional control signals may be employed to facilitate implementation of learn and age update messages that are internally broadcast on the address/data bus. In order to maintain consistency in the address table segments, each learn and age message that is broadcast on the address/data bus must be acted upon. Since I/O ASICs act upon the learn and age messages individually, implementation of the address table changes indicated by the message may require different periods of processing time in different I/O ASICs. A busy indicator bus is employed to prevent a situation in which a learn or age update message is dropped from an input queue in an I/O ASIC because too many learn or age messages are received before processing previously received learn or age messages. In particular, the busy indicator bus may be employed to prevent broadcast of an update message until each I/O ASIC has implemented the previous broadcast message. The busy indicator bus is coupled between the I/O ASICs and the arbiter/transceiver. The arbiter/transceiver refrains from granting control of the address/data bus to an I/O ASIC when a busy indicator is asserted on the busy indicator bus, but will still allow the processor to gain control of the control bus extension and address/data bus. Each I/O ASIC asserts the busy indicator before deasserting the request line, or upon receiving a learn or age message, and maintains assertion of the busy indicator until the address table segment associated with the I/O ASIC has been updated.

BRIEF DESCRIPTION OF THE SEVERAL VIEWS OF THE DRAWING

The invention will be more fully understood from the following Detailed Description of the Invention, in conjunction with the Drawing, of which.

DETAILED DESCRIPTION OF THE INVENTION

Figure 1:
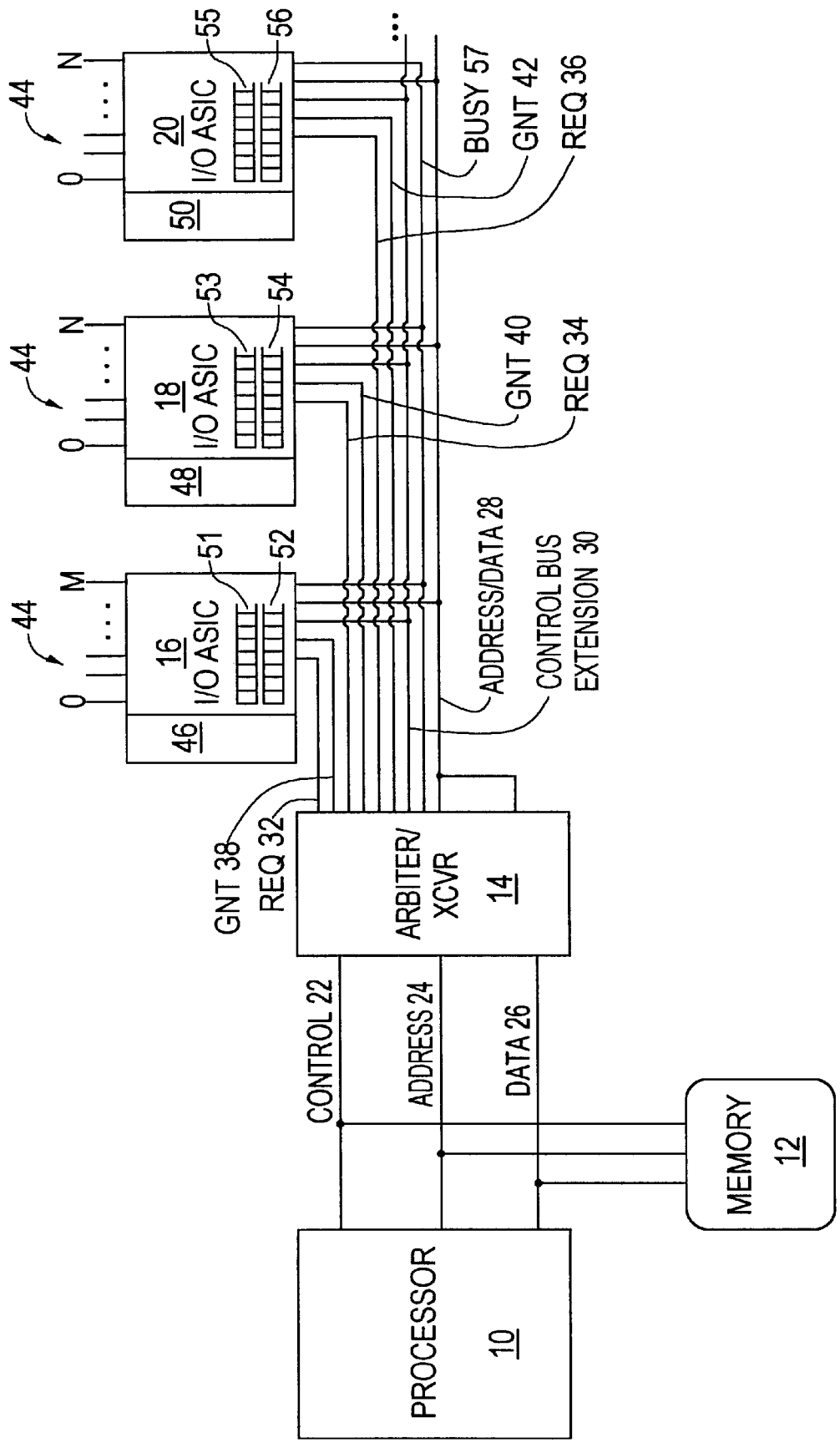
FIG. 1 is a block diagram of elements of a network switch.

Referring to FIG. 1, a network switch includes a processor 10, a memory 12, a arbiter/transceiver 14 and a plurality of Input/Output Application Specific Integrated Circuits ("I/O ASICs") 16, 18, 20 that are operative to receive and transmit data units over associated communication links and are employed to implement address learning and address aging operations. The processor 10 is coupled to the arbiter/transceiver 14 through a control bus 22, an address bus 24 and a data bus 26. The memory 12 is also coupled to the processor 10 through connections to the control bus 22, address bus 24 and data bus 26. The address bus and data bus are combined by multiplexing circuitry in the arbiter/transceiver 14 to provide an address/data bus 28. The arbiter/transceiver 14 is coupled to the I/O ASICs through connections to the address/data bus 28 and a selectively controlled extension of the control bus 30. The arbiter/transceiver is further coupled to the I/O ASICs through individual request lines 32, 34, 36 and grant lines 38, 40, 42. In particular, separate request and grant lines are employed for each I/O ASIC. In addition, a busy indicator bus connects each of the I/O ASICs 16, 18, 20 to the arbiter/transceiver 14.

Each I/O ASIC includes a plurality of ports 44 that are connected with other devices in the network. The ports 44 are employed for receiving and transmitting data units. Different I/O ASICs may include different numbers of ports. For example, in the illustrated embodiment ASIC 16 includes M ports while ASICs 18 and 20 include N ports. Further, different I/O ASICs may support different transmission protocols and different data transmission rates.

Figure 2:
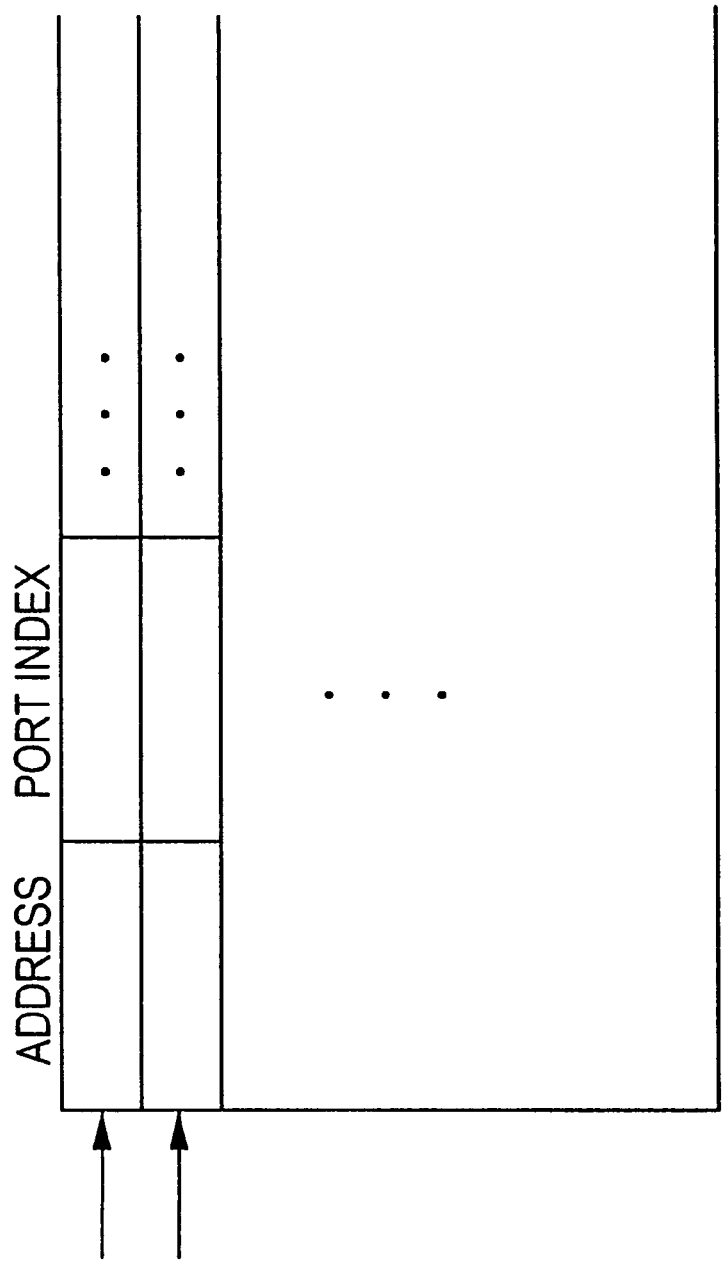
FIG. 2 is a diagram of an address table segment.

Referring to FIGS. 1 and 2, the switch employs a distributed address table having a plurality of separate table segments 46, 48, 50 each of which is coupled to a different I/O ASIC. In the illustrated embodiment, table segment 46 is coupled to I/O ASIC 16, table segment 48 is coupled to I/O ASIC 18, and table segment 50 is coupled to I/O ASIC 20. Each segment of the address table includes an identical set of entries that indicate address information that may be employed to transmit data units to various devices coupled to the network such as computers and printers. The address information includes an address indicator field and port index field indexed by a table entry. The address indicator field may contain an indicator of the Media Access Control ("MAC") address specified in the header of the data unit. The port index indicates which port or ports in the switch should be employed for forwarding a data unit with the designated MAC address to a particular device or group of devices. Following receipt of a data unit by I/O ASIC 16, for example, the address table 46 is searched for an entry with an address indicator field that pertains to the destination address specified in the data unit header. If a pertinent entry is located in the address table segment 46 then the port index contained in that entry is employed to identify the specific port or ports to be used for "forwarding" the data unit toward the destination device or devices. If a pertinent entry is not located in the address table segment 46 then the switch "floods" the data unit by transmitting the data unit through every port in the switch, or a selected subset of the switch ports. The data unit is not forwarded through the port on which the data unit was received. The use of the distributed address table improves the scalability of the switch by allowing the number of ports in the switch to be increased because the bandwidth required for address searching is limited by the number of ports supported by each I/O ASIC rather than the number of ports in the entire switch when employing a distributed table.

Address table entries can be deleted through an "aging" operation. Any entry that is not utilized within a predetermined periodic time interval is deleted, i.e., "aged." An aged entry is deleted from each segment of the address table. Aging helps to ensure that the address table contains accurate address information for active data flows.

Learning and aging operations are implemented by updating each segment of the address table. More particularly, update messages associated with the learning and aging operations are contemporaneously executed in each table segment in order to maintain coherency throughout the distributed address table. Broadcast of an update message may be initiated by any I/O ASIC. However, the initiating I/O ASIC does not act upon the address table update message until the update message is provided to all of the I/O ASICs in the switch.

Address table update messages are serialized and provided to all of the I/O ASICs through the address/data bus 28. The physical limitations of the address/data bus 28 in the illustrated embodiment limit transmission to one update message at any point in time. Hence, in the illustrated embodiment update messages which are broadcast via the address/data bus are serialized.

The arbiter/transceiver 14 is employed to manage the control bus extension 30 and the address/data bus 28. When an address table update message is generated as a result of activity at one of the I/O ASICs, the update message is placed in a transmit queue in the I/O ASIC. For example, an update message generated at I/O ASIC 16 is placed in transmit queue 52, an update message generated at I/O ASIC 18 is placed in transmit queue 54, and an update message generated at I/O ASIC 20 is placed in transmit queue 56. When the update message is loaded into one of the transmit queues, e.g., transmit queue 52, the I/O ASIC 16 asserts a request signal to the arbiter/transceiver 14 on the request line 32. As previously described, the I/O ASIC 16 and associated address table 46 do not act upon the update message before the update message is broadcast to the other ASICs. The arbiter/transceiver 14 is operative in response to the request from I/O ASIC 16 or any other I/O ASICs in the switch to apportion control of the address/data bus 28. In particular, the arbiter 14 processes the requests and grants control of the address/data bus 28 to one I/O ASIC at a time in accordance with predetermined criteria. For example, opportunities for control of the address/data bus can be offered on a weighted round-robin basis where each I/O ASIC has one opportunity for control of the address/data bus in a predetermined time period and the processor 10 has a number of opportunities for control of the address/data bus that is equal to the sum of the opportunities of the I/O ASICs. The opportunities may be interleaved to achieve a relatively even distribution.

The arbiter/transceiver 14 grants control of the address/data bus 28 to an I/O ASIC by asserting a grant signal on the grant line that couples the arbiter/transceiver to the I/O ASIC. When the arbiter/transceiver 14 grants control of the address/data bus 28 to I/O ASIC 16, the update message that is loaded in the transmit queue 52 is broadcast on the address/data bus 28 to each I/O ASIC in the switch. The update message is received in receive queues 51, 53, 55 in each I/O ASIC. Each I/O ASIC acts upon the update message once the update message has been loaded into the respective receive queue in that I/O ASIC. The arbiter/transceiver 14 refrains from granting control of the address/data bus 28 to another I/O ASIC while the address/data bus is being utilized.

Learning and aging operations may be implemented without limiting operations carried out between the processor 10 and the memory 12. In particular, since the arbiter/transceiver 14 isolates the I/O ASICs from the processor 10, the processor can access the memory 12 without being limited by use of the address bus 24, data bus 26 and control bus 22 by the I/O ASICs.

Figure 3:
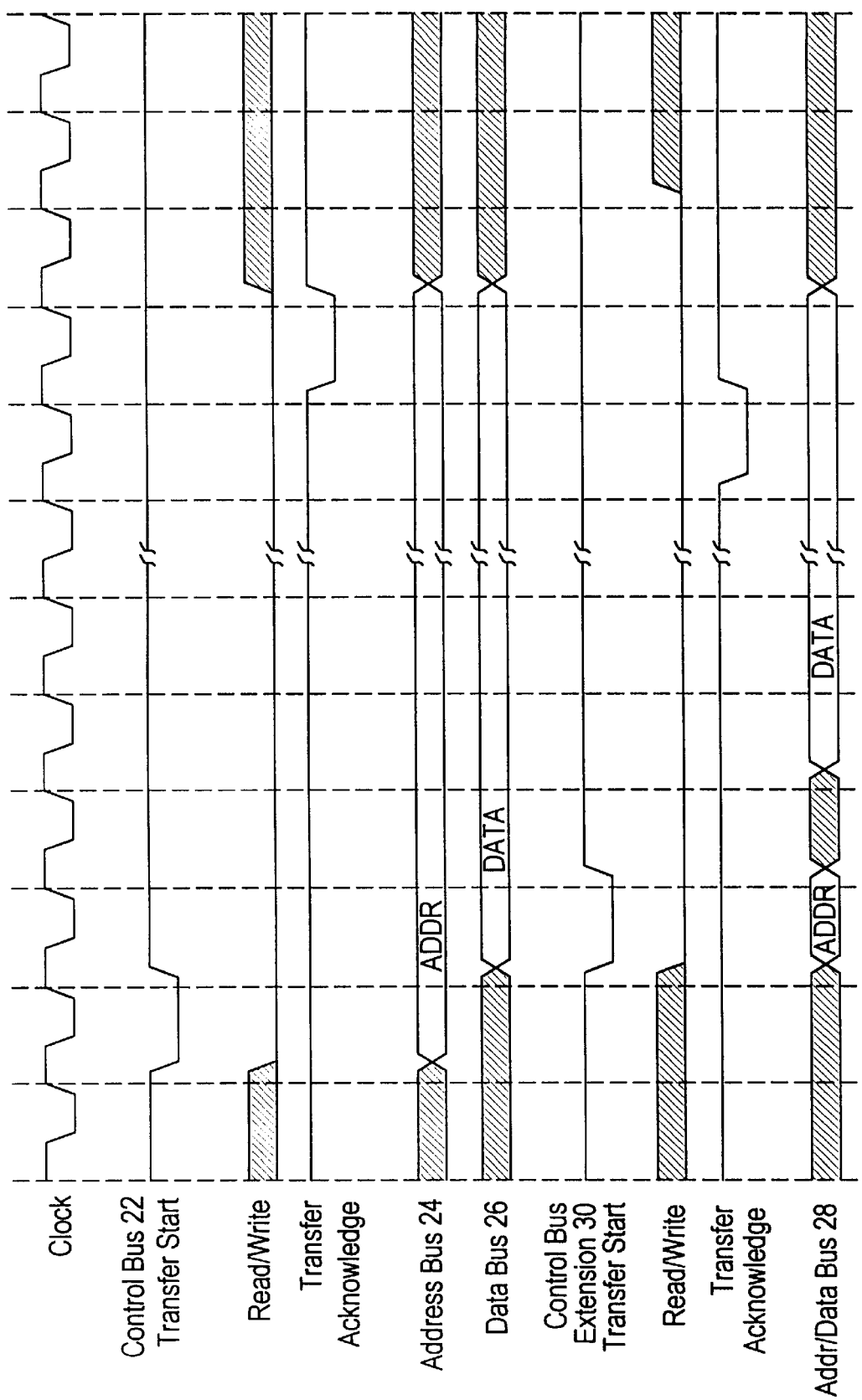
FIG. 3 is a timing diagram that illustrates a Write operation.

A Write operation is illustrated in FIG. 3. The control bus 22 and control bus extension 30 include a Transfer Start line, a Transfer acknowledge line, and a Read/Write line. The Write operation is initiated when the processor 10 drives Transfer Start active on the control bus 22 coincidentally with Write on the Read/Write line, an address on the address bus 24, and data on the data bus 26. The arbiter/transceiver will grant access to the control bus extension 30 and address/data bus 28 in accordance with predetermined criteria. The arbiter/transceiver will then drive Transfer Start active on the control bus extension 30, the address on the address/data bus 28, and Write on the Read/Write line. Transfer Start is driven inactive when transmission of the address is complete. One cycle later, the arbiter/transceiver drives the data on the address/data bus 28. It remains valid until Transfer Acknowledge is driven active by the I/O ASIC.

Figure 4:
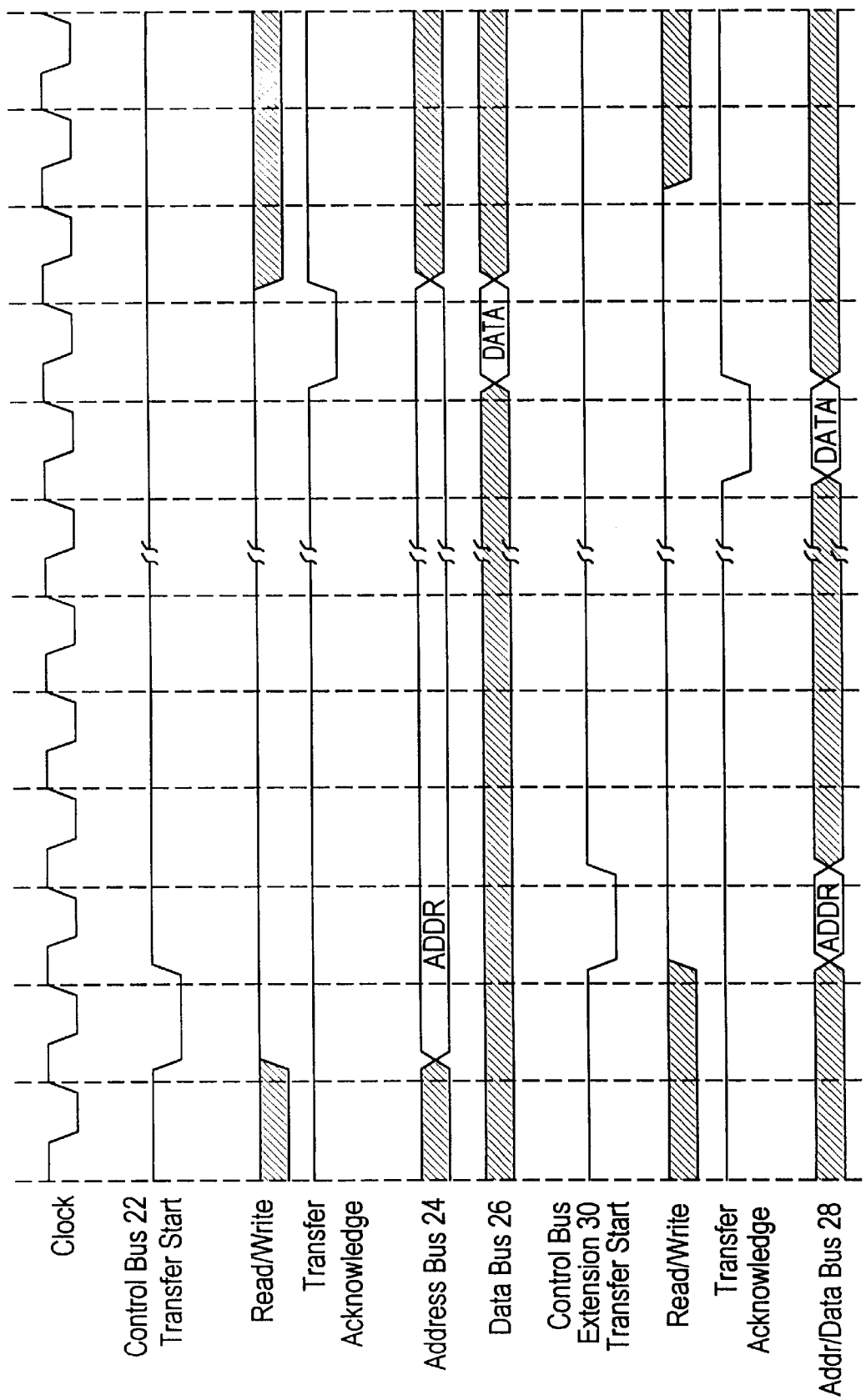
FIG. 4 is a timing diagram that illustrates a Read operation.

A Read operation is illustrated in FIG. 4. The Read operation is initiated when the processor 10 drives Transfer Start active on the control bus 22, coincidentally with Read on the Read/Write line, and an address on the address bus 24. The arbiter/transceiver will grant access to the control bus extension 30 and address/data bus 28 in accordance with predetermined criteria. The arbiter/transceiver will then drive Transfer Start active on the control bus extension 30, the address on the address/data bus 28, and read on the Read/Write line. Transfer Start is driven inactive when transmission of the address is complete. In addition, the address/data bus is released by the arbiter/transceiver. Transfer Acknowledge is driven active by the I/O ASIC, coincident with the read data on the address/data bus 28, to complete the cycle.

Figure 5:
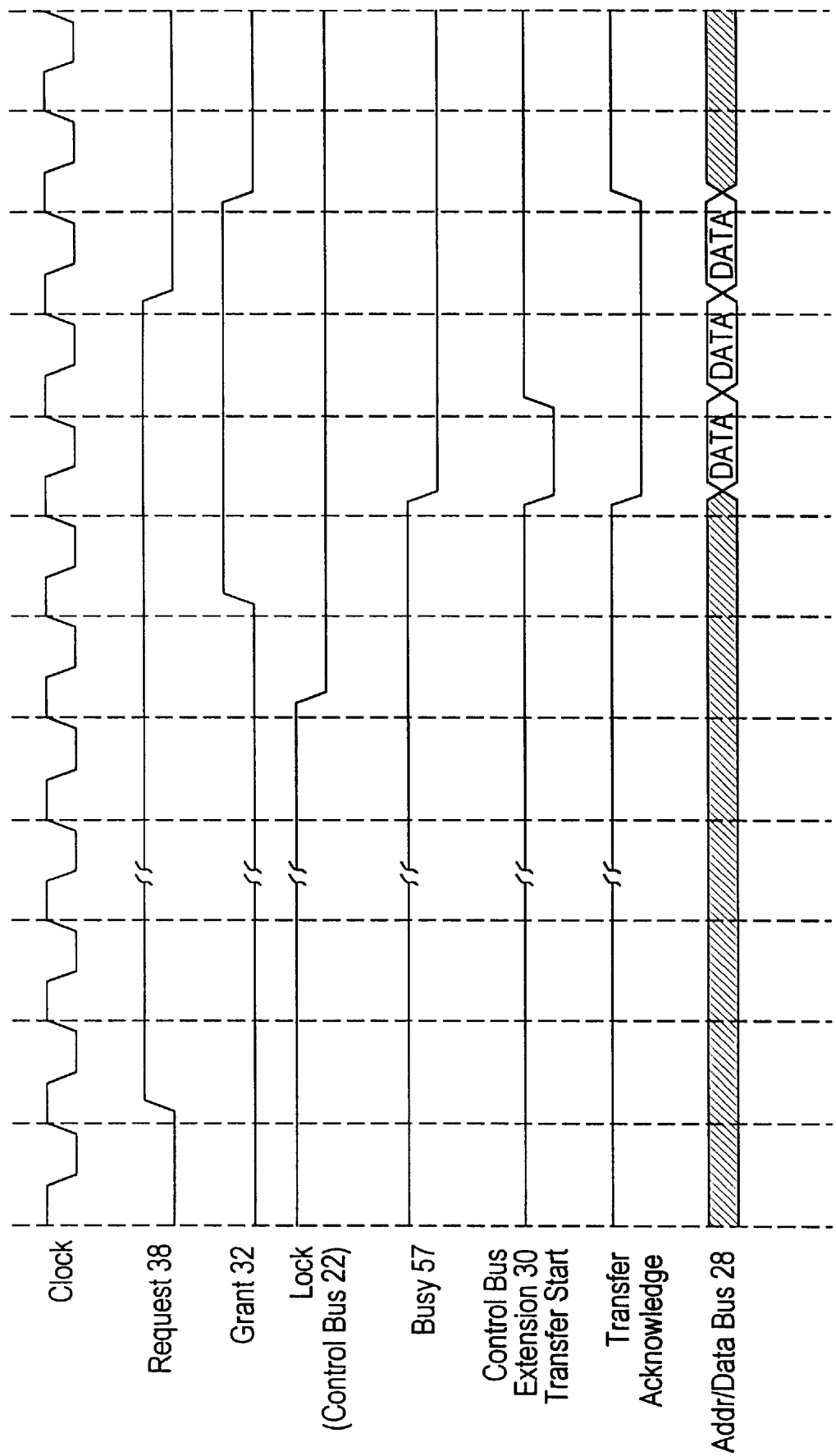
FIG. 5 is a timing diagram that illustrates broadcast of an update message associated with a learn or age operation.

Referring to FIGS. 1 and 5, broadcast of an address table update message will be described. When an address table update message is generated in one of the I/O ASICs, the I/O ASIC transmits a request for control of the address/data bus to the arbiter/transceiver by driving the request line active. The arbiter/transceiver then allocates control of the address/data bus as described above so that eventually the arbiter/transceiver grants control of the address/data bus to the requesting I/O ASIC by driving the grant line active. In the clock cycle following the cycle in which grant is driven active by the arbiter/transceiver, Transfer Start is driven active by the arbiter/transceiver. Further, Transfer Acknowledge is driven low by the I/O ASIC and data is transmitted on the address control bus by the I/O ASIC. The I/O ASIC drives Transfer Acknowledge active as long as the address/data bus is being utilized. Further, the grant line is held active for at least as long as the request line is held active. The update message is recognized as a broadcast message by the I/O ASICs in the switch because Transfer Start and Transfer Acknowledge are simultaneously driven active. It should be appreciated that the data transmitted on the address/data bus may include commands, addresses and any other data necessary to implement an update command.

Additional control signals may be employed to facilitate implementation of learn and age operations. In order to maintain consistency in the address table segments, each update message that is broadcast on the address/data bus must be acted upon. Since I/O ASICs act upon the update messages individually, implementation of the address table changes indicated by the update message may require different processing periods of time in different I/O ASICs. A busy indicator bus 57 may be employed to prevent a situation in which an I/O ASIC receives a learn or age message before implementing a previously received learn or age message. The arbiter/transceiver refrains from granting control of the address/data bus when a busy indicator is asserted on the busy indicator bus. Therefore, each I/O ASIC asserts the busy indicator upon receiving a learn or age message, and maintains assertion of the busy indicator until the address table segment associated with the I/O ASIC has been updated. The control bus 22 includes a lock signal that can be asserted by the processor to prompt the arbiter/transceiver to refrain from granting control of the address/data bus to any of the I/O ASICs.

Having described the preferred embodiments of the invention, other embodiments and variations of the invention will be apparent to those skilled in the art. Therefore, the invention should not be viewed as limited to the disclosed embodiments but rather should be viewed as limited only by the spirit and scope of the appended claims.

What is claimed is:

1. Apparatus for distributing address information, comprising:

a plurality of input/output circuits;

a distributed address table in which said address information is maintained, said distributed address table including a plurality of segments for containing identical address information, each of said segments being associated with a different one of said input/output circuits;

at least one bus that couples said input/output circuits together; and an arbiter circuit that manages control of said at least one bus by granting control of said bus to individual ones of said input/output circuits in accordance with predetermined criteria, each one of said input/output circuits responding to said granting of bus control by said arbiter circuit by broadcasting a message that prompts an update of each address table segment associated with others of said input/output circuits on said bus.

2. The apparatus of claim 1 wherein said arbiter is independently coupled to each said input/output circuit through a separate request line upon which a request signal is asserted by ones of the input/output circuits when a message is enqueued in those ones of the input/output circuits for broadcast on said bus.

3. The apparatus of claim 2 wherein said arbiter is independently coupled to each said input/output circuit through a separate grant line upon which a grant signal is asserted by said arbiter to grant control of said bus in response to assertion of said request signal.

4. The apparatus of claim 3 further including a processor and a memory that are coupled with said arbiter, said processor being operative to prompt retrieval of address information from said memory.

5. The apparatus of claim 4 wherein opportunities for control of said bus are equally divided between said processor and a group comprised of said input/output circuits.

6. The apparatus of claim 5 wherein, within said group, opportunities for control of said bus are equally divided between the input/output circuits.

7. The apparatus of claim 6 wherein a busy signal is assertable by said input/output circuits to prompt said arbiter to refrain from granting control of said bus to another input/output circuit for as long as said busy signal is asserted.

8. The apparatus of claim 7 wherein a lock signal is assertable by said processor to prompt said arbiter to refrain from granting control of said bus to an input/output circuit for as long as said lock signal is asserted.

9. The apparatus of claim 5 wherein update messages are broadcast between said input/output circuits via simultaneous assertion of a Transfer Start line and a Transfer Acknowledge line.

* * * * *

UNITED STATES PATENT AND TRADEMARK OFFICE
CERTIFICATE OF CORRECTION

PATENT NO. : 6,112,258
DATED : August 29, 2000
INVENTOR(S) : David S. Miller, et al.

Page 1 of 1

It is certified that error appears in the above-identified patent and that said Letters Patent is hereby corrected as shown below:

Column 2,
Line 44, "processor 35 is", should read -- processor is --.

Signed and Sealed this

Second Day of October, 2001

Attest:

*Nicholas P. Godici*

NICHOLAS P. GODICI
*Attesting Officer*     *Acting Director of the United States Patent and Trademark Office*